US008935356B2

(12) United States Patent
Sano et al.

(10) Patent No.: US 8,935,356 B2
(45) Date of Patent: Jan. 13, 2015

(54) NETWORK AV SYSTEM USING PERSONAL COMPUTER

(75) Inventors: Toshinobu Sano, Neyagawa (JP); Youichi Kudoh, Neyagawa (JP)

(73) Assignee: Onkyo Corporation, Osaka (JP)

( * ) Notice: Subject to any disclaimer, the term of this patent is extended or adjusted under 35 U.S.C. 154(b) by 2487 days.

(21) Appl. No.: 10/882,736

(22) Filed: Jul. 1, 2004

(65) Prior Publication Data

US 2005/0010964 A1 Jan. 13, 2005

(30) Foreign Application Priority Data

Jul. 8, 2003 (JP) ................................. 2003-272047

(51) Int. Cl.
*G06F 15/16* (2006.01)
*H04L 29/06* (2006.01)
*G11B 27/034* (2006.01)
*G11B 27/34* (2006.01)
*H04N 21/4143* (2011.01)

(52) U.S. Cl.
CPC .......... *H04L 65/1043* (2013.01); *G11B 27/034* (2013.01); *G11B 27/34* (2013.01); *H04L 29/06027* (2013.01); *H04N 21/4143* (2013.01)
USPC ........... 709/217; 709/205; 709/218; 709/231; 725/78; 725/133; 725/134; 725/141; 725/142

(58) Field of Classification Search
USPC .......... 709/217, 205, 218, 231; 725/133, 134, 725/141, 142
See application file for complete search history.

(56) References Cited

U.S. PATENT DOCUMENTS 4,466,063 A * 8/1984 Segarra et al. ................ 709/226
5,293,619 A * 3/1994 Dean ............................ 707/204

(Continued)

FOREIGN PATENT DOCUMENTS

JP 2000-231369 8/2000
JP 2000-293466 10/2000

(Continued)

OTHER PUBLICATIONS

K. Miller, K. Robertson, A. Tweedly, M. White; StarBurst Multicast File Transfer Protocol (MFTP) Specification; Apr. 1998; IETF; http://svn.tools.ietf.org/html/draft-miller-mftp-spec-03.*

(Continued)

*Primary Examiner* — Krista Zele
*Assistant Examiner* — Anthony Fabbri
(74) *Attorney, Agent, or Firm* — Renner, Otto, Boisselle & Sklar, LLP

(57) ABSTRACT

A network audio system allows AV files existing in a PC to be readily registered and music to be reproduced using a client machine. The client machine is connected to the PC and a server application and a controller application are installed in the PC. Music is reproduced using the client machine based on an AV file existing in a user folder, when the user drags and drops an icon for the AV folder to an icon for the client machine. In response to the operation, the controller application produces music piece information including the artist name and the like based the tag information of the AV file. When the music piece information is not yet registered, the server application provides the music piece information with a music piece ID for registration in the content information database. The controller application transmits a command including the ID to the client machine.

19 Claims, 16 Drawing Sheets

(56) References Cited

U.S. PATENT DOCUMENTS

| | | | |
|---|---|---|---|
| 5,625,845 A * | 4/1997 | Allran et al. | 719/322 |
| 5,633,859 A * | 5/1997 | Jain et al. | 370/234 |
| 5,781,734 A * | 7/1998 | Ohno et al. | 725/115 |
| 5,922,051 A * | 7/1999 | Sidey | 709/223 |
| 6,127,941 A * | 10/2000 | Van Ryzin | 340/4.37 |
| 6,173,323 B1 * | 1/2001 | Moghe | 709/224 |
| 6,192,340 B1 * | 2/2001 | Abecassis | 704/270 |
| 6,255,961 B1 * | 7/2001 | Van Ryzin et al. | 340/3.1 |
| 6,344,727 B1 * | 2/2002 | Desai et al. | 320/107 |
| 6,363,434 B1 * | 3/2002 | Eytchison | 719/313 |
| 6,381,599 B1 * | 4/2002 | Jones et al. | 707/5 |
| 6,393,430 B1 * | 5/2002 | Van Ryzin | 707/104.1 |
| 6,499,027 B1 * | 12/2002 | Weinberger | 707/4 |
| 6,510,210 B1 * | 1/2003 | Baughan | 379/90.01 |
| 6,553,404 B2 * | 4/2003 | Stern | 709/203 |
| 6,830,160 B2 * | 12/2004 | Risolia | 221/3 |
| 7,716,362 B1 * | 5/2010 | Razza et al. | 709/232 |
| 8,056,103 B2 * | 11/2011 | Candelore | 725/78 |
| 8,417,804 B2 * | 4/2013 | White | 709/221 |
| 8,655,994 B2 * | 2/2014 | White | 709/221 |
| 8,756,633 B2 * | 6/2014 | Malik | 725/43 |
| 2002/0072817 A1 * | 6/2002 | Champion | 700/94 |
| 2002/0162112 A1 * | 10/2002 | Javed | 725/87 |
| 2002/0170061 A1 * | 11/2002 | DiLorenzo | 725/78 |
| 2002/0184638 A1 * | 12/2002 | Agnihotri et al. | 725/89 |
| 2003/0009760 A1 | 1/2003 | Sakamoto et al. | |
| 2003/0051037 A1 * | 3/2003 | Sundaram et al. | 709/227 |
| 2003/0070173 A1 | 4/2003 | Nakano et al. | |
| 2004/0010800 A1 * | 1/2004 | Goci | 725/78 |
| 2004/0158860 A1 * | 8/2004 | Crow | 725/46 |
| 2005/0055716 A1 * | 3/2005 | Louie et al. | 725/58 |
| 2005/0289224 A1 * | 12/2005 | Deslippe et al. | 709/208 |
| 2009/0254950 A1 * | 10/2009 | Craigie et al. | 725/80 |

FOREIGN PATENT DOCUMENTS

| | | |
|---|---|---|
| JP | 2001-257707 | 9/2001 |
| JP | 2003-22224 | 1/2003 |
| JP | 2003-46512 | 2/2003 |
| WO | 02/03690 | 1/2002 |
| WO | WO 03/102919 | 11/2003 |

OTHER PUBLICATIONS

K. Miller, K. Robertson, A. Tweedly, M. White; StarBurst Multicast File Transfer Protocol (MFTP) Specification; Apr. 1998; IETF; http://svn.tools.ietf.org/html/d raft-miller-mftp-spec-03.*

The document on the Internet at URL:http://www.cd3o.com/index. html under the title of "cd3o Network MP3 Players" (found by searching online on Jun. 13$^{th}$ and 17$^{th}$, 2003).

European Search Report for corresponding Application 04015401.5, dated Sep. 17, 2004.

"cd3o Network MP3 Players" dated 2003, XP-02294633.

Onkyo Corporation, Audio Network Receiver NC-500 Instruction Manual, dated Apr. 16, 2003 XP-002294634.

Onkyo Corporation, Network Audio Receiver dated 2001, XP-002294635.

Inno Pocket, SLIMP3 Network MP3 Player, dated Mar. 27, 2003, XP-002294636.

WenSoftware, Music Library—Manage your music collection has never been so easy!, dated Apr. 15, 2003, XP-002294638.

The document on the Internet at URL:http://www.gspr.com/integra/ nettune_software.html under the title of "Integra Upgrades Net-Tune Distributed Audio Technology with Pc-Based Servers and New Software Control Capabilities", dated Feb. 26, 2003, XP002294637.

* cited by examiner

NETWORK AV SYSTEM USING PERSONAL COMPUTER

BACKGROUND OF THE INVENTION

1. Field of the Invention

The present invention relates to network AV (Audio Video) network systems, and more preferably to a network AV system using a general-purpose personal computer (hereinafter simply as "PC").

2. Description of the Related Art

Today, PCs have come into widespread use in general households and more users have come to listen to music using their PCs. Music reproducing application programs are installed in their PCs for reproducing music with the PCs. The music reproducing application program allows an AV file to be read out from the hard disk or a CD (Compact Disk), and the decoded music data is provided to the sound board mounted in the PC. The sound board converts the music data into analog audio signals for application to the speaker.

The quality of music reproduced by the PC is however considerably degraded as compared to dedicated audio equipment and not high enough to satisfy the user. Application programs other than the music reproducing application program run in the PC at the same time, and therefore alert tones or the like produced by those application programs are sometimes audible in reproduced music.

Meanwhile, network AV systems based on a client-server system have recently been provided. Typical such systems reproduce music, while others reproduce video. In the following, those for reproducing music will mainly be described by way of illustration.

According to the disclosure of PCT/JP03/06552 filed prior to the present application, a network audio system includes server machine that stores a large number of AV files and client machine connected through a LAN (Local Area Network). The client machine requests the server machine to provide a desired AV file, and the server machine distributes the requested AV file to the client machine in response. The client machine reproduces music based on the AV file distributed from the server machine.

The network audio system further includes controller equipment that monitors and controls the client machine through the server machine. The controller equipment monitors the state of the client machine and instructs the client machine to carry out desired operation in response to the operation of the user.

The network audio system can reproduce high quality music but the user must have some knowledge about LAN in order to set up the system. Audio users can often be PC users as well, but not many of them have enough knowledge about LAN to build up a home network. This is a primary reason why the network audio system is not widespread.

The PC can reproduce music based on all the AV files in the hard disk or the like, but the network audio system can reproduce music only based on AV files registered in the server machine. The AV files existing in the hard disk or the like may be registered and then reproduced, but the process of registering them is complicated.

The document on the Internet at URL: http://www.cd3o.com/index.html under the title of "cd3o Network MP3 Players" (found by searching online on Jun. 13 and 17, 2003) discloses a network MP3 player that can be connected to existing audio equipment. According to the document, digital music is transmitted by radio to the network MP3 player through a home network from a PC. In this way, the user can listen to the digital music on the PC using the existing audio equipment.

SUMMARY OF THE INVENTION

It is an object of the invention to provide a network AV system that can be built up simply by adding client machine to an existing PC.

Another object of the invention is to provide a network AV system whose client machine can be operated using a PC.

Yet another object of the invention is to provide a network AV system that allows AV files existing in the hard disk or the like of a PC to be registered by simple operation.

A still further object of the invention is to provide a network AV system that can reproduce high quality sounds and/or visual images without letting alert tones or other noises from a PC mingle into them.

A network AV system according to the invention includes a PC and a client machine. The PC has a memory device (such as a hard disk, a semiconductor memory, and an optical disk) for storing a plurality of AV files. The client machine is connected to the PC through a network and reproduces audio sounds and/or video images based on an AV file distributed from the PC. The PC has a server application program and a controller application program installed. The controller application program includes the steps of selecting a desired AV file among the AV files stored in the memory device in response to the operation of the user, and transmitting a reproducing instruction of the selected AV file to the client machine. The client machine includes a transmitter responsive to the reproducing instruction from the controller application program and transmitting a request to distribute the selected AV file to the server application program. The server application program includes the steps of reading out the selected AV file from the memory device in response to the distribution request from the client machine, and distributing the read out AV file to the client machine.

In the above-described network AV system, a desired AV file is selected among the AV files stored in the memory device in response to the user's operation to the PC, and an instruction to reproduce the AV file is transmitted from the PC to the client machine. The client machine transmits a distribution request for the AV file in response to the reproducing instruction. The PC reads out the AV file from the memory device in response to the distribution request and distributes the AV file to the client machine. The client machine reproduces audio sounds and/or video images based on the desired AV file in the PC. Therefore, according to the invention, the user can build up a network AV system simply by adding a client machine to the existing PC and operate the client machine using the PC. Since the AV file is distributed from the PC to the client machine, alert tones and the like produced by the PC are not mixed, so that high quality sounds or video images can be reproduced.

Preferably, the memory device has a server region under the control of the server application program and a general region other than the server region. The memory device stores a database for registering AV information related to the AV files. The step of selecting selects the desired AV file among the AV files stored in the general region. The server application program further includes the step of registering AV information related to the selected AV file in the database.

In this way, the desired AV file is selected among the AV files stored in the general region, and AV information related to the AV file is registered in the database. Therefore, the user can register AV files existing in the hard disk or the like in the PC by the simple operation.

Preferably, the controller application program further includes the step of displaying an icon for the client machine to be displayed on a display for the PC. The step of selecting selects the desired AV file in response to the operation of the user to drag and drop an icon for the desired AV file to the icon for the client machine.

In this way, the desired AV file is selected and its AV information is registered by so-called drag and drop operation. Therefore, the operation of registering AV files can readily be carried out.

More preferably, the controller application program further includes the steps of producing the AV information based on the tag information of the selected AV file, and transmitting a request to register the produced AV information to the server application program. The step of registering registers the produced AV information in response to the registration request from the controller application program.

In this way, the AV information is produced based on the tag information of the selected AV file and registered. The tag information includes the file name, the artist name, the album title, the genre, the length of the music piece, the file format and the like, and therefore the user does not have to input these kinds of information.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
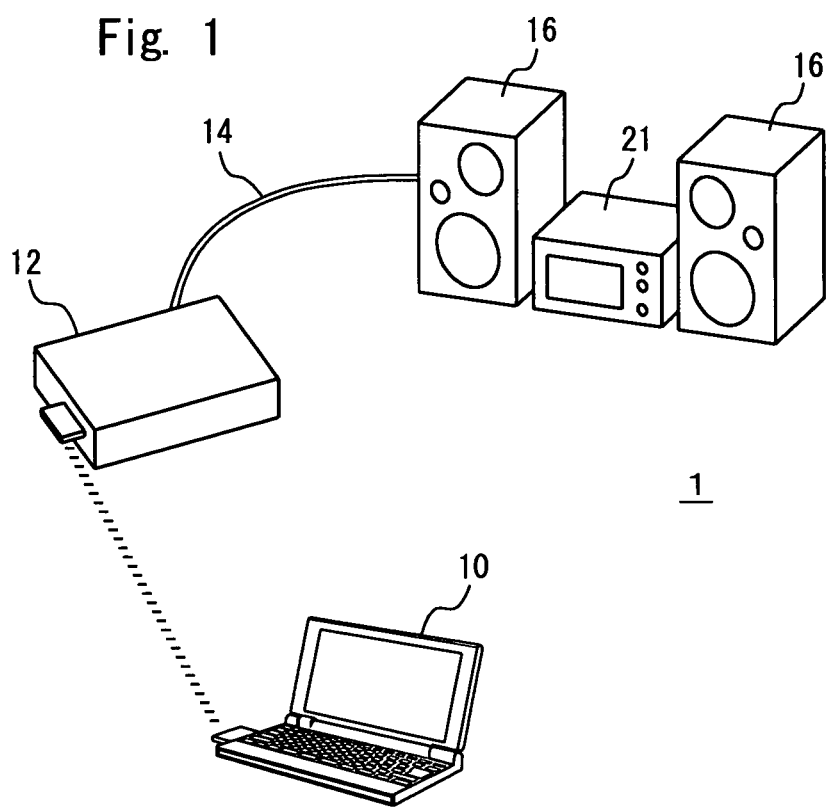
FIG. 1 is a general perspective view of a network audio system according to an embodiment of the invention.

Now, an embodiment of the invention will be described in conjunction with the accompanying drawings in which the same or corresponding portions are denoted by the same reference characters and their description equally applies.

1. Architecture 1.1. Overall System Referring to FIG. 1, a network audio system 1 according to an embodiment of the invention includes a note PC 10 and a client machine 21.

The note PC 10 is a general-purpose device often used in general households and connected to a router 12. The router 12 is also a general-purpose device often used in general households and also serves as a modem for ADSL (Asymmetric Digital Subscriber Line). The note PC 10 is connected to the Internet through the router 12. The router 12 also serves as a hub, and a plurality of PCs can be connected with each other through the router. In the example shown in FIG. 1, a single client machine 21 is connected to the router 12 through a LAN cable 14.

The client machine 21 is a network adapted audio device and generates analog audio signals based on AV files distributed from a server. The generated analog signals are output to a speaker 16.

Figure 2:
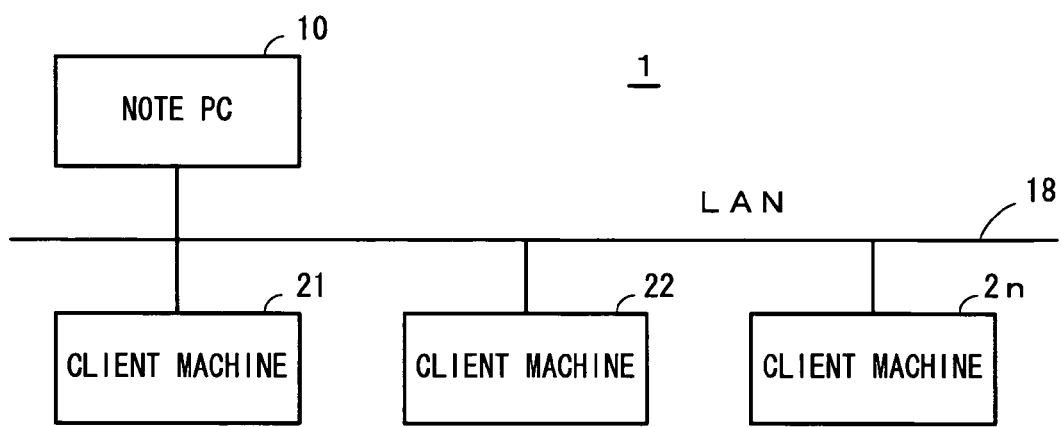
FIG. 2 is a functional block diagram of the general configuration of the network audio system shown in FIG. 1.

The network audio system 1 needs only have one such client network device 21, but the system may include a plurality of client machines 21 to 2n as shown in FIG. 2. These client machines 21 to 2n are connected to the note PC 10 through a LAN 18. The note PC 10 is employed in the network audio system 1 but a desktop PC may be employed. In the network audio system 1, the single PC 10 is connected to the LAN 18 but there may be a plurality of PCs connected to the LAN.

1.2. PC

Figure 3:
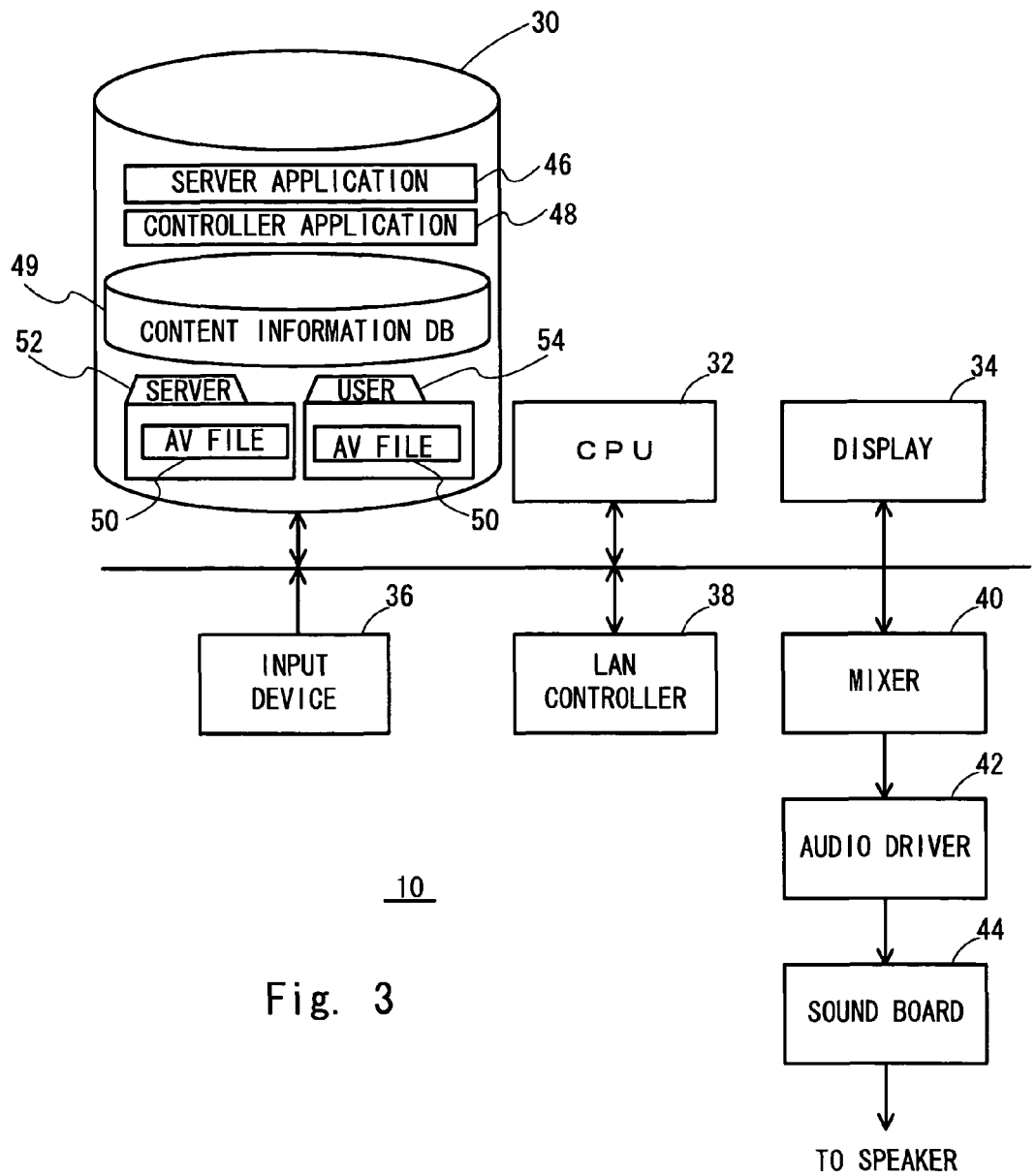
FIG. 3 is a functional block diagram of the configuration of the PC shown in FIGS. 1 and 2.

Referring to FIG. 3, the PC 10 includes a hard disk 30, a CPU (Central Processing Unit) 32, a liquid crystal display 34, an input device 36 such as a keyboard and a mouse, a LAN controller 38, a mixer 40, an audio driver 42, and a sound board 44.

A server application program (hereinafter simply as "server application") 46 and a controller application program (hereinafter simply as "controller application") 48 are installed in the PC 10. More specifically, the hard disk 30 stores the server application 46 and the controller application 48. The hard disk 39 stores the server application 46 and the controller The AV files 50 are in the format of MP3, WMA or the like. The AV files 50 are mainly stored in a server folder 52 under the control of the server application while some of the AV files 50 downloaded from the Internet or the like are stored in a user folder 54 under the user control.

The server application 46 allows the PC 10 to carry out the following steps, so that AV files 50 are distributed in a streaming manner to the client machines 21 to 2n in response to a request from the client machines 21 to 2n. The controller application 48 allows the PC 10 to carry out the following steps, so that the state of the client devices 21 to 2n (such as reproducing, stop, fast-forwarding, reversing, the presently reproduced music piece, and the volume) is monitored and the client devices 21 to 2n are instructed to carry out desired operation (such as music piece selection, reproducing, stop, pause, fast-forwarding, reversing, and volume control) in response to the operation of the user.

The hard disk 30 also stores a content information database 49. The content information database 49 includes music piece information as given in Table 1 for each piece of music.

TABLE 1 music piece information

| | |
|---|---|
| filename | file name |
| title | title of music piece |
| artist | artist |
| album | album title |
| genre | genre |
| length | length of music piece (time) |
| type | file format |
| songID | music piece ID |

The music piece information includes the file name, the title of the music piece, the artist, the album title, the genre, the length of the music piece (time), the file format, and the music piece ID. As the file name, the full path indicating the location of the AV file 50 on the hard disk 30 is recorded. As the file format, the format of the AV file 50 is recorded. As the music ID, an identification number allocated to each music piece is recorded.

For the AV files 50 in the server folder 52, all the music piece information is registered in the content information database 49. For the AV files 50 in the user folder 54, only desired music piece information selected by the user is stored in the content information database 49. Details of how to register the information will be described later. The controller application 48 allows only the music pieces registered in the content information database 49 to be reproduced by the client machines 21 to 2n.

In most cases, various application programs are installed in the PC 10 in addition to the server application 46 and the controller application 48. Audio sound data pieces generated from the application programs or OS (Operating System) are synthesized by the mixer 40 and applied to the sound board 44 through the audio driver 42. The sound board 44 converts the audio sound data into analog audio signals and outputs the signals to a built-in or externally attached speaker (not shown).

1.3. Client Machine

Figure 4:
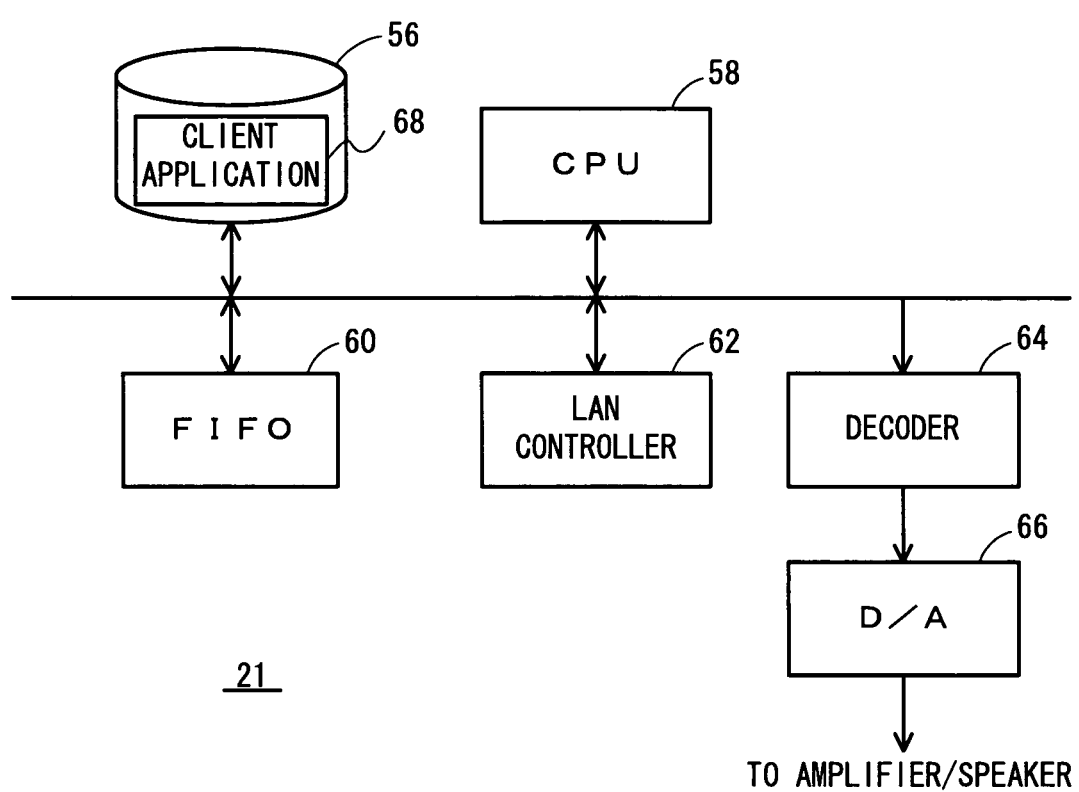
FIG. 4 is a functional block diagram of the configuration of the client machine shown in FIGS. 1 and 2.

Referring to FIG. 4, the client machine 21 includes a hard disk 56, a CPU 58, an FIFO (First-In First-Out) memory 60, a LAN controller 62, a decoder 64, and a D/A converter 66.

A client application program (hereinafter simply as "client application") 68 is installed in the client machine 21. More specifically, the hard disk 56 stores the client application 68. The client application 68 allows the client machine 21 to carry out the following steps, so that the server application 46 is requested to distribute an AV file, and the distributed AV file is provided to the decoder 64. The decoder 64 decodes the AV file and applies the resulting data to the D/A converter 66. The D/A converter 66 converts the digital audio signals from the decoder 64 into analog audio signals for output to a speaker 16 through an amplifier (not shown).

The other client machines 22 to 2n have the same configuration as that of the client machine 21.

2. Operation 2.1. Connection with Server Application

The controller application 48 is activated and establishes connection with the server application 46. Hereinafter, the connection processing by the controller application 48 with the server application 46 will be described, while the connection by the client application 68 with the server application 46 is established in the same manner.

Figure 5:
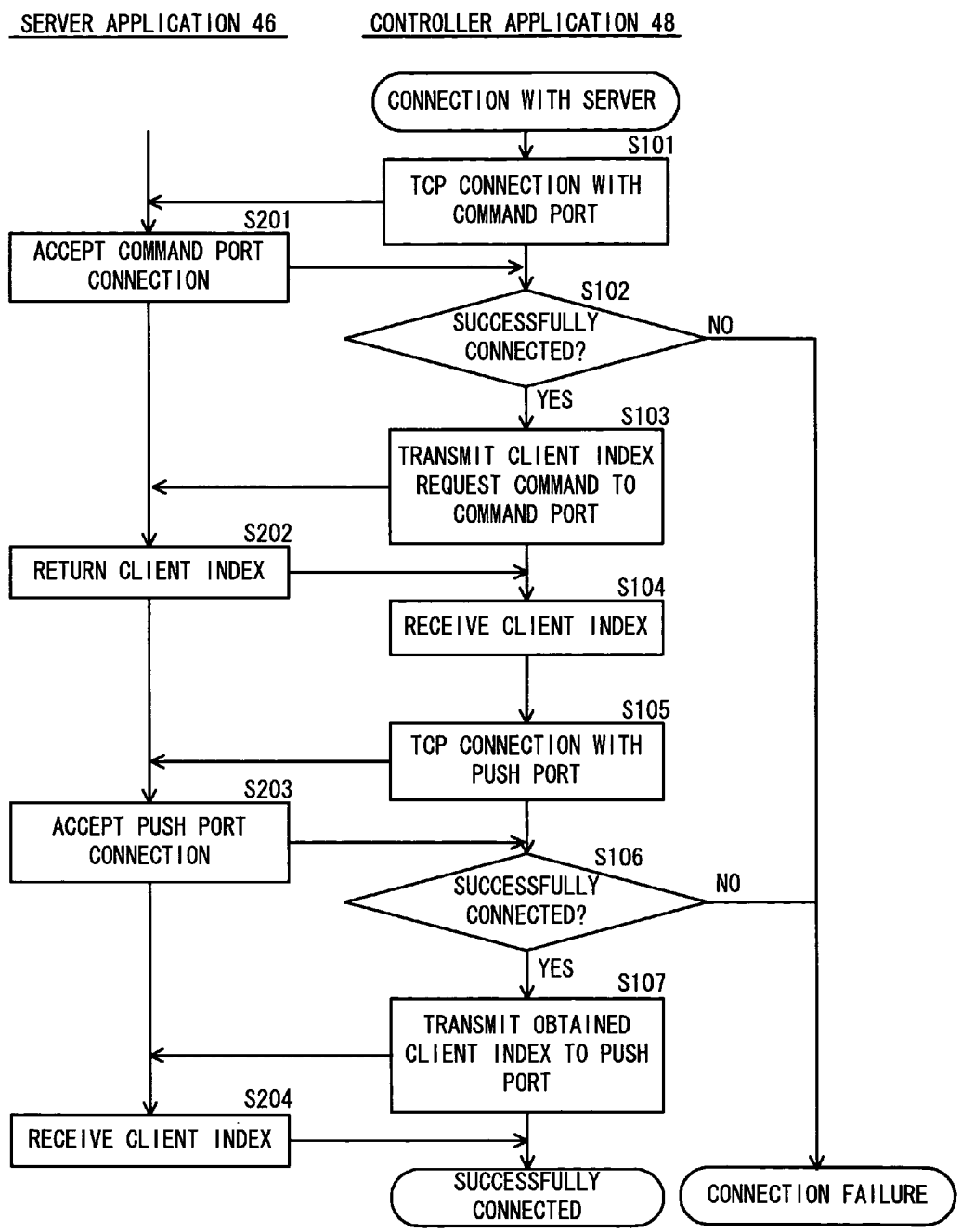
FIG. 5 is a flowchart for use in illustration of the processing of connecting with the server application by the controller application in FIG. 3.

Referring to FIG. 5, the controller application 48 produces a socket using the IP (Internet Protocol) address and command port of the note PC 10 according to TCP (Transmission Control Protocol) and requests connection with the server application 46 using the socket (S101). The command port receives the command from the controller application 48 to the server application 46 and transmits a response from the server application 46 to the controller application 48. The server application 46 accepts connection at the command port (S201) and the process proceeds to step S103 if the connection is successfully established (S102). In this way, the controller application 48 establishes the connection with the command port for the server application 46.

The controller application 48 then transmits a client index request command to the command port (S103). The server application 46 responds to the client index request command to return the client index from the command port to the controller application 48 (S202), and the controller application 48 receives the index (S104). The client index request command is a command for the controller application 48 to request the server application 46 to provide the client index. The client index is an identifier (ID) allocated to the controller application 48 from the server application 46.

The controller application 48 then produces a socket using the IP address and the push port of the note PC 10 and requests connection with the server application 46 using the socket (S105). The push port is a port to transmit a request from the server application 46 to the controller application 48. The server application 46 accepts connection at the push port (S203) and the process proceeds to step S107 if the connection is successfully established (S106). In this way, the controller application 48 establishes the connection with the push port for the server application 46. Note however that in this point, the server application 46 still cannot specify whether the connected application is the controller application 48 or the client application 68. Therefore, the controller application 48 transmits the client index received in step S104 to the push port for the server application 46 (S107). The server application 46 receives the client index (S204) and then specifies the application connected to the push port as the controller application 48 based on the index.

2.2. GUI (Graphical User Interface)

Figure 6:
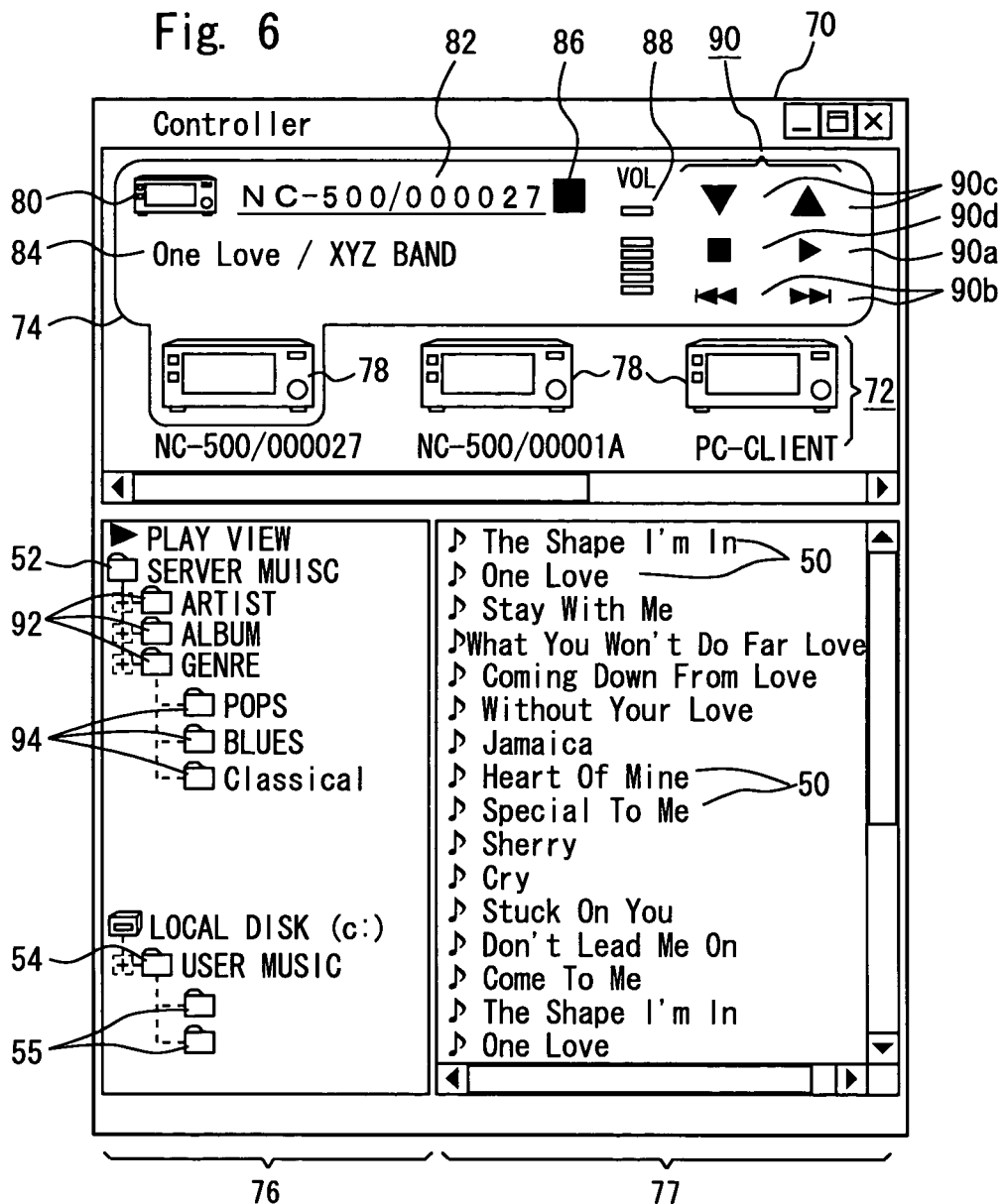
FIG. 6 is a view of the display screen of the PC shown in FIGS. 1 and 2.

When the controller application 48 is activated, the note PC 10 displays a controller application window (hereinafter simply as "window") 70 as shown in FIG. 6 on the display 34. The window 70 includes a client selection area 72, a client operation/monitoring area 74, a folder tree area 76, and a music list area 77.

The client selection area 72 displays the icons 78 for the client machines 22 to 2n activated and connected to the LAN 18. The user can click the icon 78 for a desired client machine among them to select the client machine to be operated and monitored.

In the client operation/monitoring area 74, buttons for indicating the state of the selected client machine and buttons for operating the selected client machine are displayed. More specifically, the displayed buttons include those for a stand-by icon 80 to indicate a power-on or stand-by state, the name 82 of the client machine, the title plus the artist name 84 of the presently reproduced music piece, a status icon 86 indicating the operation state, a volume icon 88 indicating the sound volume, and an operation button 90 (for volume control, stop, reproducing, reversing, and fast-forwarding).

In the folder tree area 76, the server folder 52 (the icon therefor) and the user folder 54 (the icon therefor) are displayed. A category folder 92 (for artist, album, genre and the like) positioned in a directory below the server folder 52 and a sub category folder 94 (for pops, blues, classical music and the like) in a directory further below the category folder 92 are displayed. One or more displayed sub category folders 94 constitute a category list (genre list in FIG. 6). A sub user folder 55 positioned in a directory below the user folder 54 is displayed.

In the music list area 77, one or more AV files 50 in the folders (for example, 54 or 94) selected in the folder tree area 76 are displayed. More specifically, the file names of the AV files 50 (the titles of the music pieces) are displayed. The one or more displayed AV files 50 constitute a music list.

The user can edit the music list displayed in the music list area 77. For example, the user may drag an AV file 50 in the music list area 77 and drops the file between other AV files 50 in order to change the order of music pieces in the music list. The user may also drag an AV file 50 from an entirely different folder and drop the file in the music list area 77 in order to add a music piece to the music list. The user may delete an AV file 50 in the music list area 77 in order to delete the music piece from the music list.

2.3. Selecting Client Machine

Referring to FIG. 6, the user clicks a desired one of the icons 78 for the client machines 22 to 2n, and the controller application 48 responds to the operation to select a desired client machine as an object to be operated and monitored. Now, how the client machine 21 is selected will be described by way of illustration.

Figure 7:
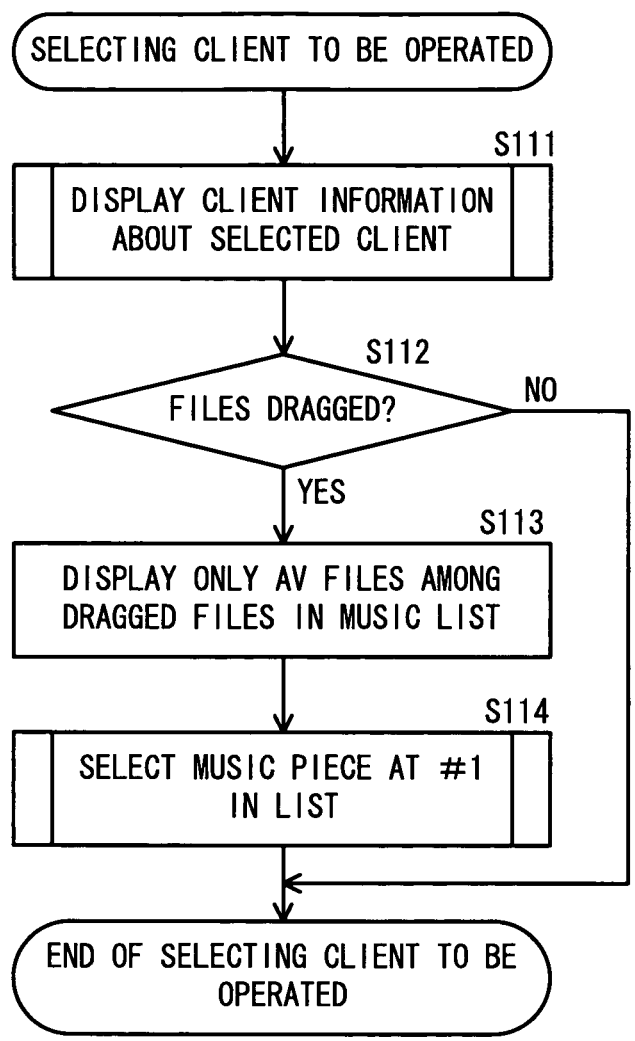
FIG. 7 is a flowchart for use in illustration of the processing of selecting music piece using the display screen shown in FIG. 6 by the controller application.
Figure 8:
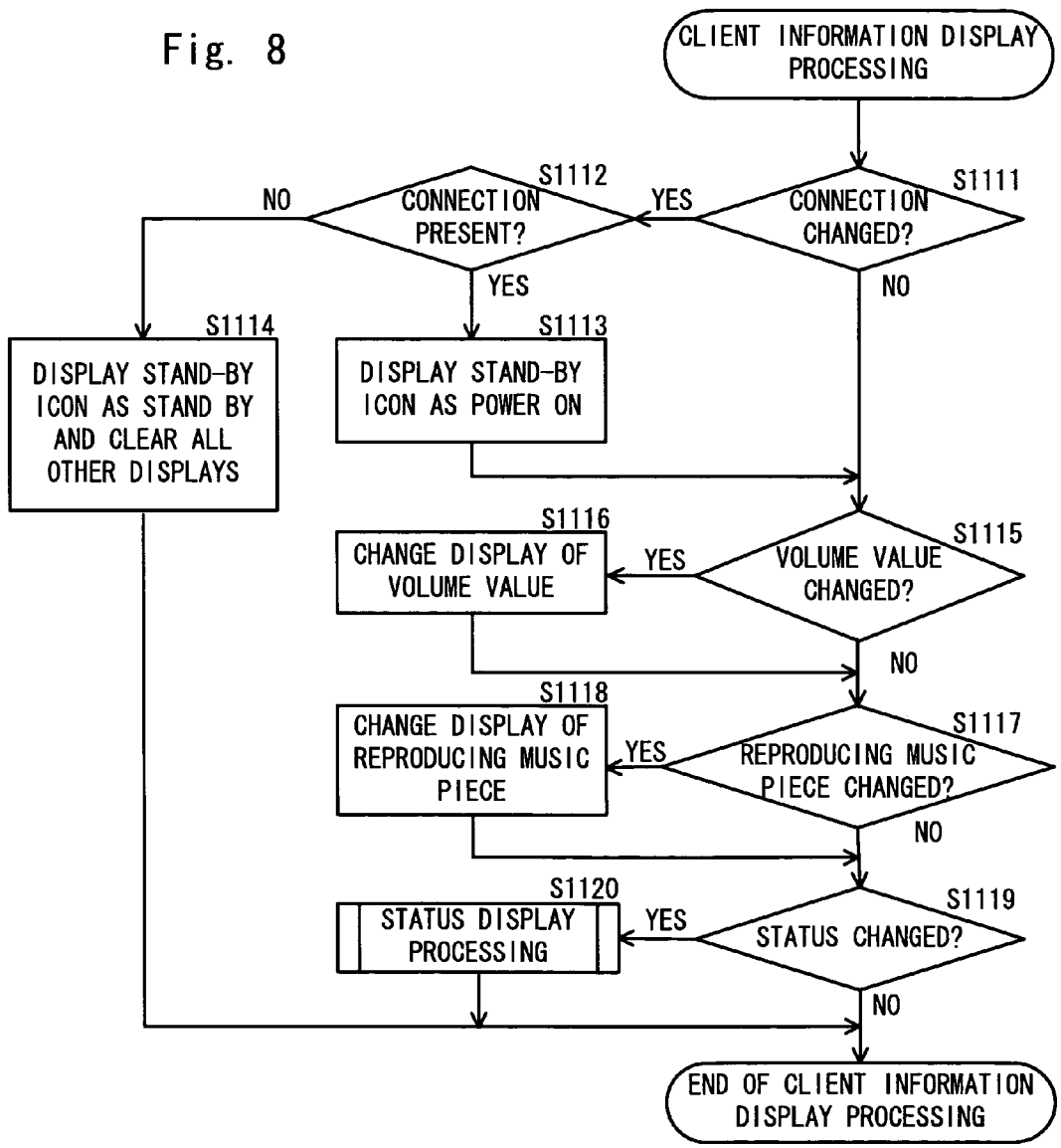
FIG. 8 is a flowchart for use in illustration of details of the client information displaying processing in FIG. 7.

Referring to FIG. 7, the controller application 48 carries out client information display processing shown in FIG. 8 about the client machine 21 (S111).

When the user drags one or more desired files in the user folder 54 and drops the files onto the icon 78 for the client machine 21 selected by the user, the controller application 48 detects the operation (S112) and displays only AV files 50 among the dragged files in the music list area 77 (S113). Whether or not each of the files is an AV file is determined based on the extension of the file. When the user drags and drops the desired files directly onto the icon 78 for a client machine 21 without pre-selecting a client machine 21 to be operated and monitored, the controller application 48 similarly displays only the AV files 50 in the music list area 77 (S113).

The controller application 48 then instructs the selected client machine 21 to reproduce the first music piece displayed in the music list area 77 (S114).

In the above example, the file is dragged and dropped from the user folder 54 displayed in the folder tree area 76, while such a file may be dragged and dropped from the user folder 54 displayed by a general purpose browser.

2.4. Displaying Client Information

Now, the client information display processing in the above step S111 will be described.

The client application 68 notifies the server application 46 of the client information given in Table 2 every time the status (operation state) changes. The server application 46 stores the notified client information in the hard disk 30 and transfers the information to the controller application 48. The controller application 48 stores the client information as the client monitoring information as given in Table 3 and changes the display of the client operation/monitoring area 74 shown in FIG. 6 based on the client monitoring information.

Table 2 displays client information produced for each of client machines 21 to 2n.

TABLE 2

| client information | |
|---|---|
| flag | indicating presence/absence of connection |
| type | client type |
| status | present status |
| volume | present volume value |
| productid | product ID |
| firmwareid | firmware ID (version) |
| hostname | client name |
| songID | music piece ID |
| curKey | list construction key |

The client information is stored in the hard disk 30 of the PC 10 and managed by the server application 46. In the information, the term "flag" indicates the presence/absence of connection with the serve application 46. If there is connection, the "flag" is set, while if there is no connection, the "flag" is reset. The term "type" indicates the client type such as the client application 68 and the controller application 48. The term "status" indicates the present status (operation state) such as reproducing, stop, completion, pause, fast-forwarding, and reversing. The term "stop" indicates the state in which the reproducing of the selected music piece is stopped midway in response to the operation of the controller application 48 or the client machines 21 to 2n. The term "completion" indicates the state in which the selected music piece has been reproduced to the end. The term "volume" indicates the present volume value (sound volume). The term "productid" indicates a product ID (machine information) provided for each client type. Clients of the same type are provided with the same product ID. The term "firmwareid" is a firmware ID indicating the version of firmware installed in the client machine. The term "hostname" indicates a client name provided to the client machine. The term "songID" indicates a music piece ID to identify the presently reproduced music piece. The term "curKey" indicates a list construction key necessary for producing a music list presently reproduced.

The list construction key includes a filter kind and a keyword list. The filter kind is based on a title, a genre, an artist, an album title, a file name or the like. If for example the filter kind is about an artist name, the name of a desired artist is recorded as a keyword. A desired music list can be produced by searching through the content information database 49 using the list construction key, details of which is disclosed by PCT/JP03/06552 described above.

Table 3 shows client monitoring information produced for each of the client machines 21 to 2n to be operated and monitored by the controller application 48.

TABLE 3

| | client monitoring information |
|---|---|
| flag | indicating presence/absence of connection |
| type | client type |
| status | present status |
| volume | present volume value |
| productid | product ID |
| firmwareid | firmware ID (version) |
| hostname | client name |
| songID | music piece ID |
| curKey | list construction key |
| setcurKey | list construction key set by controller |
| PlayList | music list selected by controller |
| setIndex | music number in list selected by controller |

The client monitoring information is stored in the hard disk 30 of the PC 10 and managed by the controller application 48 to operate and monitor the client machine. The client monitoring information includes "setcurKey", "PlayList", and "setindex" in addition to the client information described above. The term "setcurKey" represents a list construction key necessary for specifying a temporary music list (play list) edited by the controller application 48 in response to the operation of the user. The term "PlayList" represents the temporary music list. The "setindex" represents a music number allocated to the music piece selected by the control application 48 and reproduced by the client machine at present.

Referring to FIG. 8, the controller application 48 compares the client information transferred from the server application 46 to the stored client monitoring information and checks whether or not the "flag", "volume", "songID", and "status" are changed.

More specifically, the controller application 48 compares the "flag" and determines whether there has been a change (S1111). If there is a change, the controller application 48 determines whether there is connection (S1112). If there is connection, the stand-by icon 80 is displayed in the power-on state (S1113), and if there is no connection, the stand-by icon 80 is displayed in the stand-by state, while all the other displays are cleared (S1114).

The controller application 48 compares the "volume" and determines whether or not the volume value is changed (S1115). If there is a change, the controller application 48 changes the display of the volume icon 88 (S1116). The controller application 48 compares the "songID" and determines whether or not the presently reproduced music piece is changed (S1117). If there is a change, the controller application 48 changes the display of the title plus the artist name 84 of the presently reproduced music piece (S1118). The controller application 48 compares the "status" and determines whether or not the status is changed (S1119). If there is a change, the controller application 48 carries out status display processing (details of which will be described) shown in FIG. 9 (S1120).

2.5. Displaying Status

Now, the process of displaying the status in step S1120 will be described.

Figure 9:
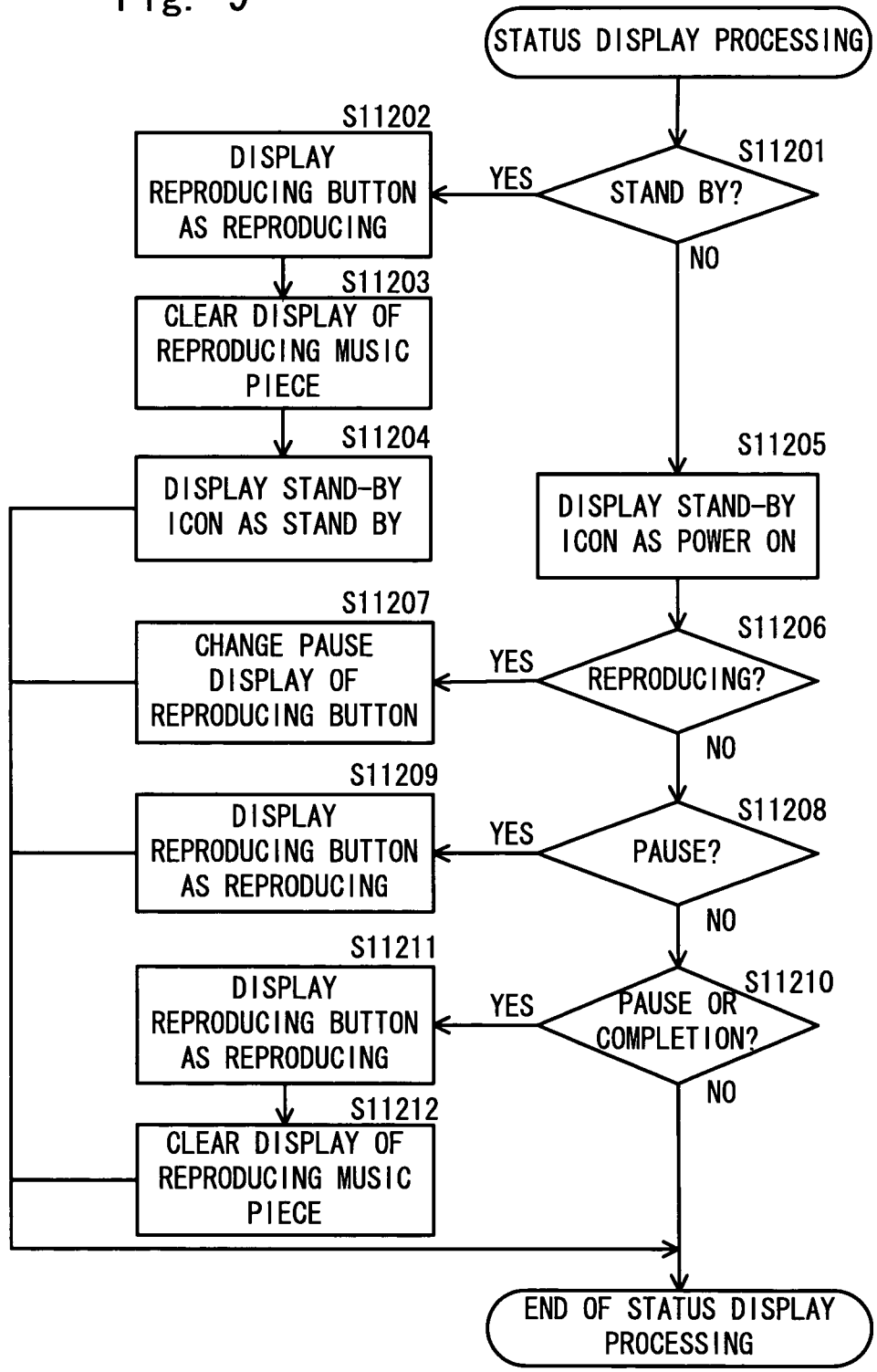
FIG. 9 is a flowchart for use in illustration of details of the status displaying processing in FIG. 8.

Referring to FIG. 9, the controller application 48 displays the status of the client machine 21 based on the "status".

More specifically, the controller application 48 determines whether or not the "status" indicates standby (S11201). If it is a stand-by state, the controller application 48 displays the reproducing button 90a by a reproducing mark (a triangle whose apex is directed to the right) (S11202), clears the display of the title plus the artist name 84 of the music piece (S11203), and displays the stand-by icon 80 in the stand-by state (S11204). If it not the stand-by state, the controller application 48 displays the stand-by icon 80 in the power-on state (S11205).

The controller application 48 determines whether or not the "status" indicates reproducing (S11206). If it is a reproducing state, the controller application 48 displays the status icon 86 by the reproducing mark, and the reproducing button 90a by a pause mark (a vertical double line) (S11207). The controller application 48 determines whether or not the "status" indicates pause (S11208). If it is pause, the controller application 48 displays the status icon 86 by the pause mark, and the reproducing button 90a by the reproducing mark (S11209). The controller application 48 determines whether or not the "status" indicates stop or completion (S11210). If it is stop or completion, the controller application 48 displays the status icon 86 by the stop mark (a regular square), and the reproducing button 90a by the reproducing mark (S11211). The controller application 48 then clears the display of the title plus the artist name 84 of the music piece (S11212).

2.6. Selecting Music Piece

Figure 10:
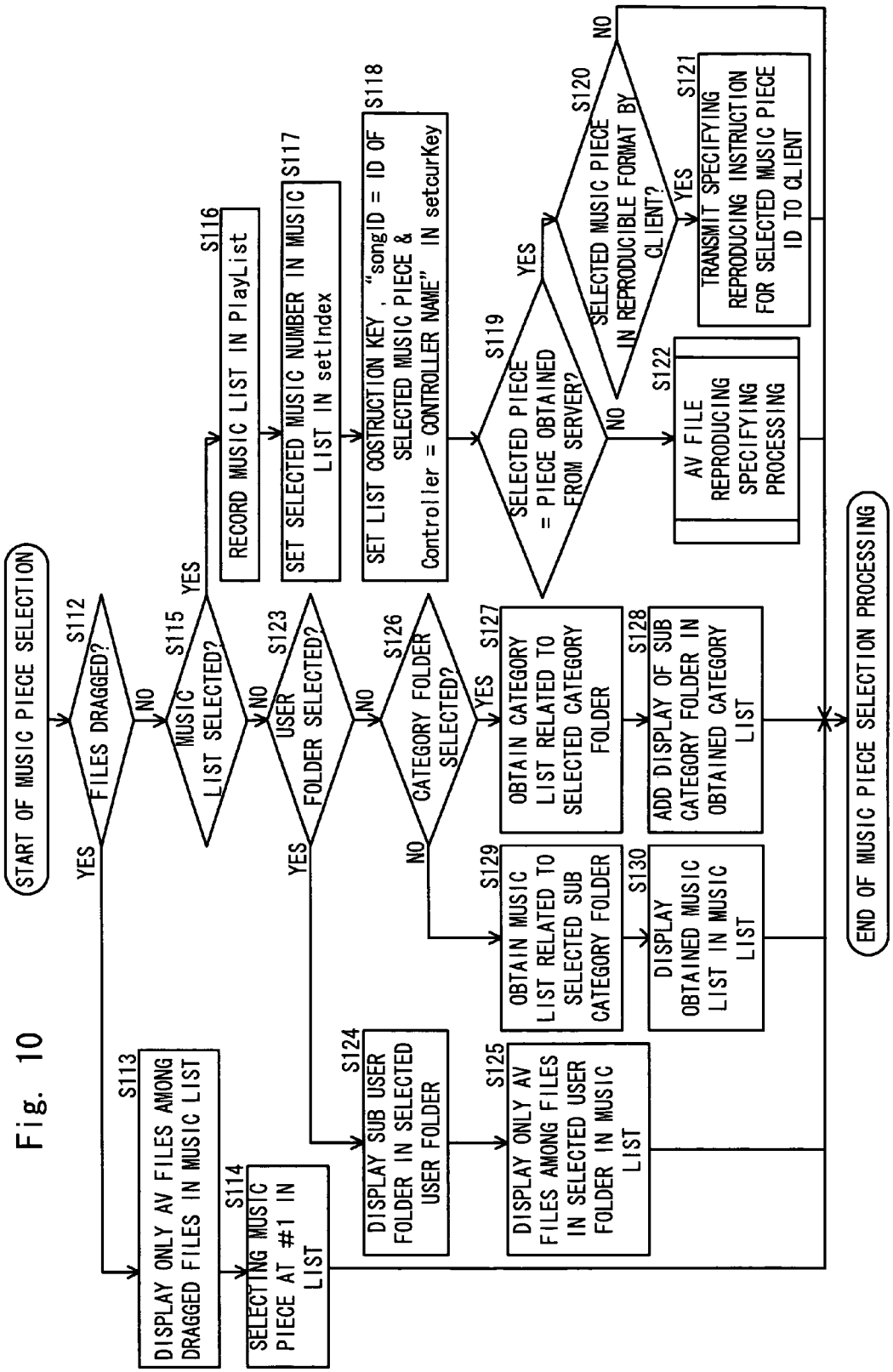
FIG. 10 is a flowchart for use in illustration of the music piece selecting processing by the controller application in FIG. 3.

Referring to FIG. 10, the process of how a music piece is selected by the controller application 48 will be described. Note however that steps S112 to S114 are the same as those in FIG. 7 and therefore will not be described again.

When the user selects the user folder 54 in the folder tree area 76 (S123), the controller application 48 displays a sub user folder 55 in the selected user folder 54 in the folder tree area 76 (S124). The controller application 48 displays only the AV files 50 in the selected user folder 54 in the music list area 77 (S125). Note that when the user selects the displayed sub user folder 55, only the AV files 50 in the sub user folder 55 are displayed in the music list area 77 (not shown).

When the user selects a desired category folder 92 in the folder tree area 76 (S126), the controller application 48 obtains a category list related to the category folder 92 from the server application 46 (S127). In FIG. 6, a category folder 92 for genre is selected, and therefore a genre list is obtained. The controller application 48 displays a sub category folder 94 included in the obtained category list in the folder tree area 76 (S128).

When the user selects the sub category folder 94, not the category folder 92 (S126), the controller application 48 obtains a music list related to the sub category folder 94 from the server application 46 (S129) and displays only the AV files 50 included in the music list in the music list area 77 (S130).

When the user selects desired music pieces in a music list (S115), the controller application 48 records the music list as a presently reproduced music list in the client machine 21 in the "PlayList" in the client monitoring information (S116) and sets the numbers allocated to the selected music pieces in the music list (reproducing music numbers) in the "setindex" (S117). The controller application 48 can edit the music list and instruct the device to continuously reproduce the music pieces in the order in the edited music list. Therefore, the music list and the number for the music piece last instructed to be reproduced are stored.

The controller application 48 sets a list construction key in the "setcurKey" (S118). As the list construction key, both "songID=selected music piece ID" and "Controller=name of controller" are set. The controller name is set in order to determine which has selected a music piece whose reproducing is finished by the client machine 21 among the controller application 48, the client machine 21 or another controller application (not shown).

The controller application 48 determines whether or not the selected music piece is a piece obtained from the server application 46 (S119). If the piece is obtained from the server folder 52, the controller application 48 determines whether or not the AV file 50 of the selected music piece is in a format that can be reproduced by the client machine 21 (S120), and if the piece can be reproduced, a specified music piece reproducing instruction command for the selected music piece ID is transmitted to the client machine 21 (S121). Meanwhile, if the selected piece is a music piece obtained from the user folder 54, the controller application 48 carries out AV file reproducing specifying processing shown in FIG. 13 (S122).

2.7. Continuous Reproducing

When the client machine 21 finishes reproducing the selected music piece to the end, client information including a completion status is transmitted to the server application 46, and the server application 46 transfers this information to the controller application 48. The controller application 48 carries out the following continuous reproducing processing in response to the completion status.

Figure 11:
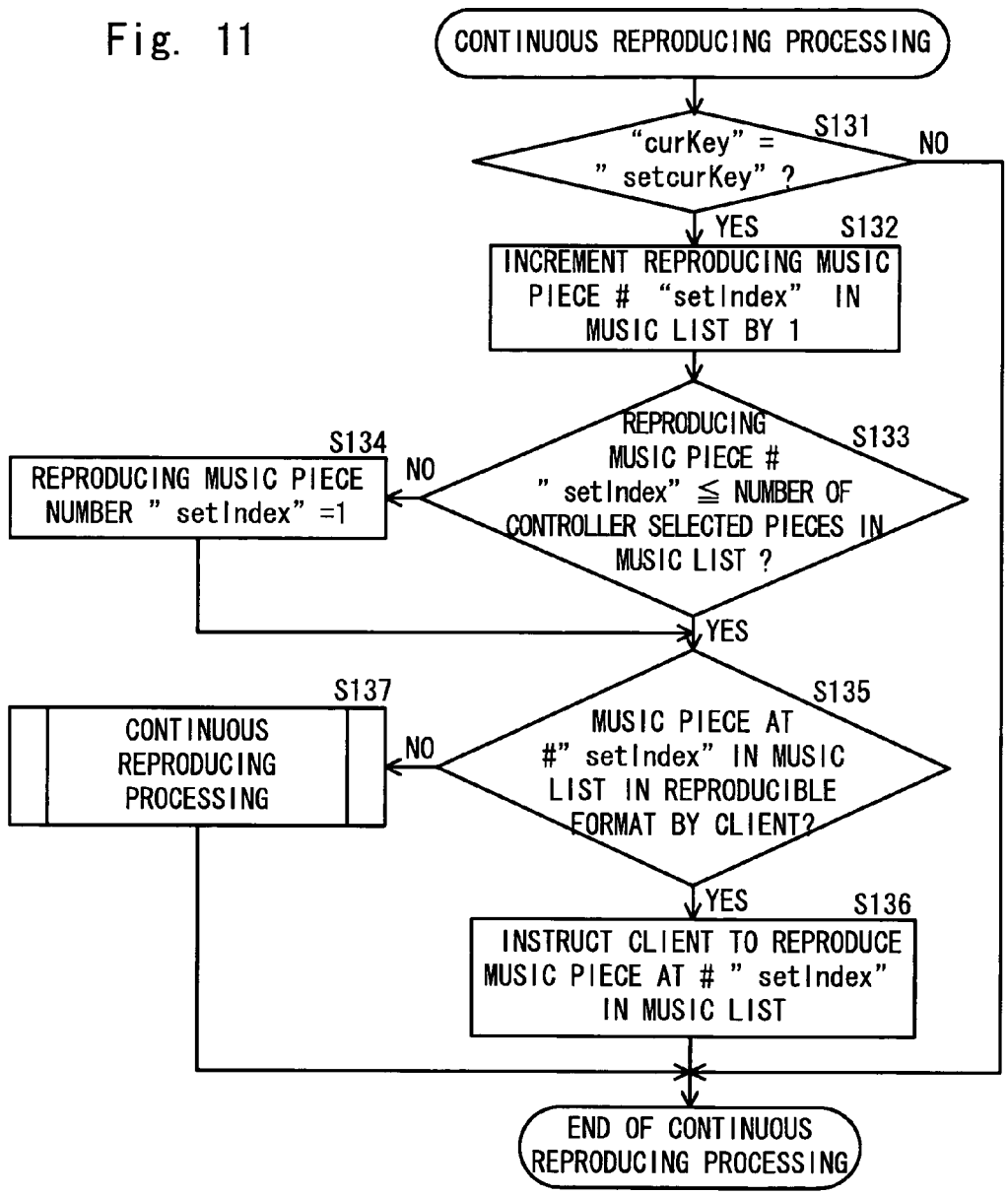
FIG. 11 is a flowchart for use in illustration of the continuous reproducing processing by the controller application in FIG. 3.

Referring to FIG. 11, the controller application 48 compares the list construction key "curKey" in the received client information to the stored list construction key "setcurKey" in the client monitoring information (S131). In this way, the controller application 48 can determine whether the music piece whose reproducing is completed by the client machine 21 is a music piece selected by the controller application 48, the client machine 21, or another controller application 48.

When "curKey"="setcurKey", the controller application 48 determines that the music piece selected by the controller application 48 has been reproduced to the end, and increases the reproducing music piece number "setindex" in the client monitoring information in order to select the next music piece to be reproduced (S132).

The controller application 48 then determines whether the reproducing music piece number "setindex" is not more than the number of music pieces in the selected music list (S133). If the reproducing music piece number "setindex" is more than the number of pieces in the music list, the controller application 48 determines that the client machine 21 has reproduced the music pieces to the end of the music list and resets the reproducing music piece number "setindex" to "1" in order to set the next music piece to be reproduced to the first music piece in the list (S134).

When the reproducing music piece number "setindex" is not more than the number of music pieces in the music list, the controller application 48 checks whether the music piece represented by the "setindex" is in a format that can be reproduced by the client machine 21 (S135). If the piece is in a reproducible format, the controller application 48 instructs the client machine 21 to reproduce the music piece represented by the "setindex" in the music list (S136). Meanwhile, if the piece is in an irreproducible format, the controller application 48 carries out the continuous reproducing processing recursively in order to reproduce the next music piece. In short, the controller application 48 instructs the client machine 21 to skip the music piece in the irreproducible format by the client machine 21 and reproduce the next music piece.

2.8. Operating Client Machine

Figure 12:
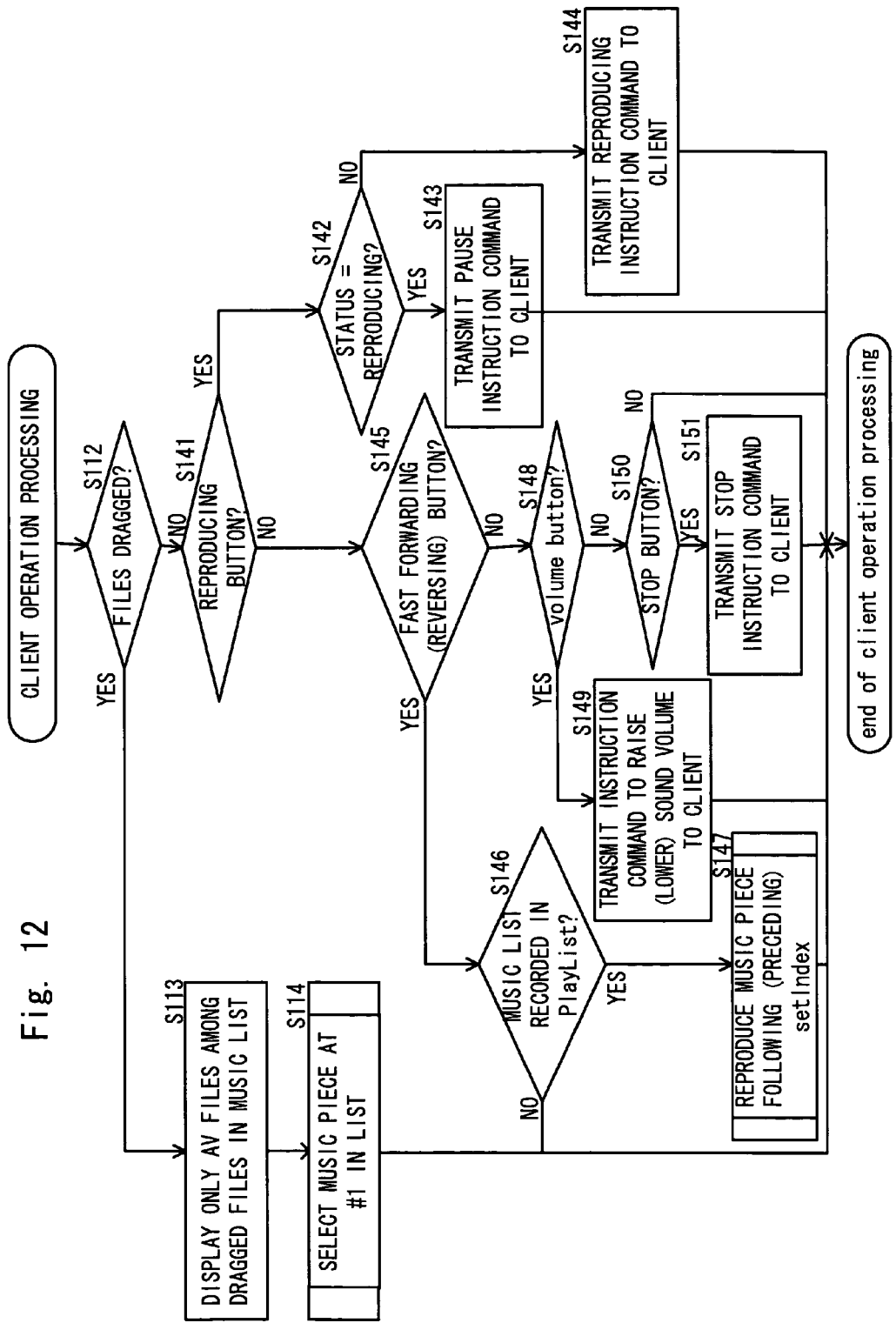
FIG. 12 is a flowchart for use in illustration of the processing of operating the client machine by the controller application in FIG. 3.

Referring to FIG. 12, the operation of the client machine 21 by the controller application 48 will be described. Note that steps S112 to S114 are the same as those in FIGS. 7 and 10 and therefore will not be described again.

When the user clicks the reproducing button 90a shown in FIG. 6 (S141), the controller application 48 determines whether or not the "status" indicates reproducing (S142). If the "status" indicates reproducing, the reproducing button 90a is displayed by the pause mark by the status display processing shown in FIG. 9, and therefore the controller application 48 transmits a pause instruction command to the client machine 21 (S143). Meanwhile, when the "status" indicates anything other than reproducing, the reproducing button 90a is displayed by the reproducing mark, and therefore the controller application 48 transmits a reproducing instruction command to the client machine 21 (S144).

When the user clicks the fast-forwarding or reversing button 90b (S145), the controller application 48 determines whether a music list is recorded in the "PlayList" in the client monitoring information in response to the operation (S146). If a music list is recorded, the controller application 48 specifies the music piece instructed to be reproduced immediately before in the music list based on the "setindex" in the client monitoring information and selects the next or previous music piece. The controller application 48 then transmits a reproducing instruction command to the client machine 21 (S147).

When the user clicks the volume button 90c (S148), the controller application 48 transmits a volume raising or lowering instruction command to the client machine 21 in response to the operation (S149). When the user clicks the stop button 90d (S150), the controller application 48 transmits a stop instruction command to the client machine 21 in response to the operation (S151).

2.9. AV File Reproducing Specifying Processing

Figure 13:
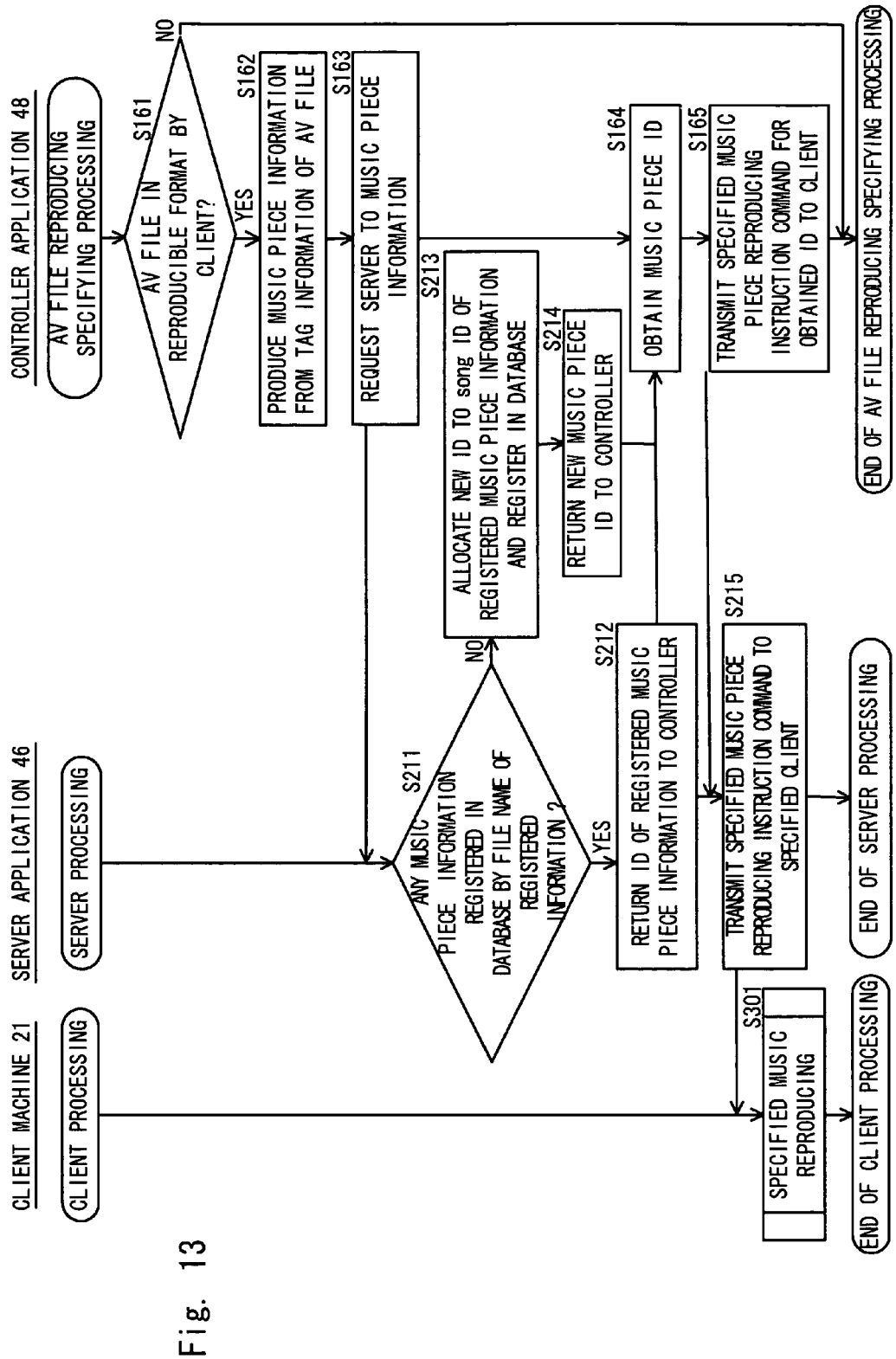
FIG. 13 is a flowchart for use in illustration of details of the AV file reproducing specifying processing in FIG. 10.

Now, referring to FIG. 13, AV file reproducing specifying processing or how the controller application 48 newly registers an AV file 50 in the user folder 54 and the client machine 21 reproduces music based on the AV file 50 will be described.

When the user clicks a desired sub user folder 55 in the user folder 54 in the folder tree area 76 shown in FIG. 6, the controller application 48 displays one or more AV files in the sub user folder 55 in the music list area 77.

When the user drags a desired AV file 50 from the music list area 77 and drops it to the icon 78 for the client machine 21 to be operated (or when a client machine 21 is previously selected and an AV file 50 is selected in the music list area 77), the controller application 48 compares the format of the AV file 50 with the format in the client information that can be reproduced by the client machine 21 to be operated and determines whether the AV file 50 is in the reproducible format by the client machine 21 (S161). If the format is reproducible, the controller application 48 extracts the title of the music piece, the artist, the album title, the genre and the length of the music piece from the tag information of the AV file 50 and produces music information as given in Table 1 (S162).

The controller application 48 requests the server application 46 to register the produced music piece information (S163). The server application 46 responds to the request to check whether there is music piece information that has already been registered by the same file name in the content information database 49 (S211). If the music piece has already been registered by the name, the server application 46 transmits the music piece ID of the already registered music piece information to the controller application 48 (S212). Meanwhile, if no music piece has been registered by the name, the server application 46 provides a new music piece ID and the music piece information is registered in the content information database 49 (S213). The server application 46 then transmits the music piece ID to the controller application 48 (S214).

Figure 14:
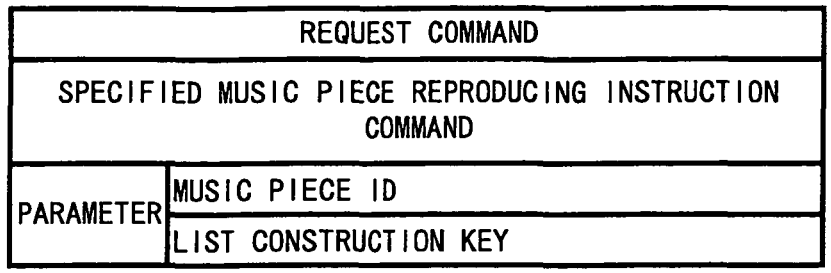
FIG. 14 is a table showing a specified music piece reproducing instruction command transmitted to a client machine through the server application from the controller application in FIG. 13.

The controller application 48 obtains the music piece ID returned from the server application 46 (S164) and transmits a specified music piece reproducing instruction command shown in FIG. 14 to the server application 46 (S165). The specified music piece reproducing instruction command includes the obtained music piece ID and the list construction key.

The server application 46 transfers the specified music piece reproducing instruction command transmitted from the controller application 48 to the client machine 21 (S215). The client machine 21 responds to the specified music piece reproducing instruction command and carries out specified music piece reproducing processing shown in FIG. 15 (S301).

According to the AV file reproducing specifying processing, a desired AV file 50 is selected in the user folder 54 and music piece information related to the AV file 50 is automatically registered in the content information database 49, so that the user can register existing AV files 50 in the user folder 54 with the simple operation. The music piece information is automatically produced from the tag information of the AV file 50 and registered in the content information database 49, and therefore the user does not have to input the title of the music piece, the artist, the album title, the genre, the length of the piece and the like. Note that in this example, the AV file 50 existing in the hard disk 30 is registered, while an AV file in an optical disk such as a CD can be registered.

2.10. Reproducing Specified Music Piece

Figure 15:
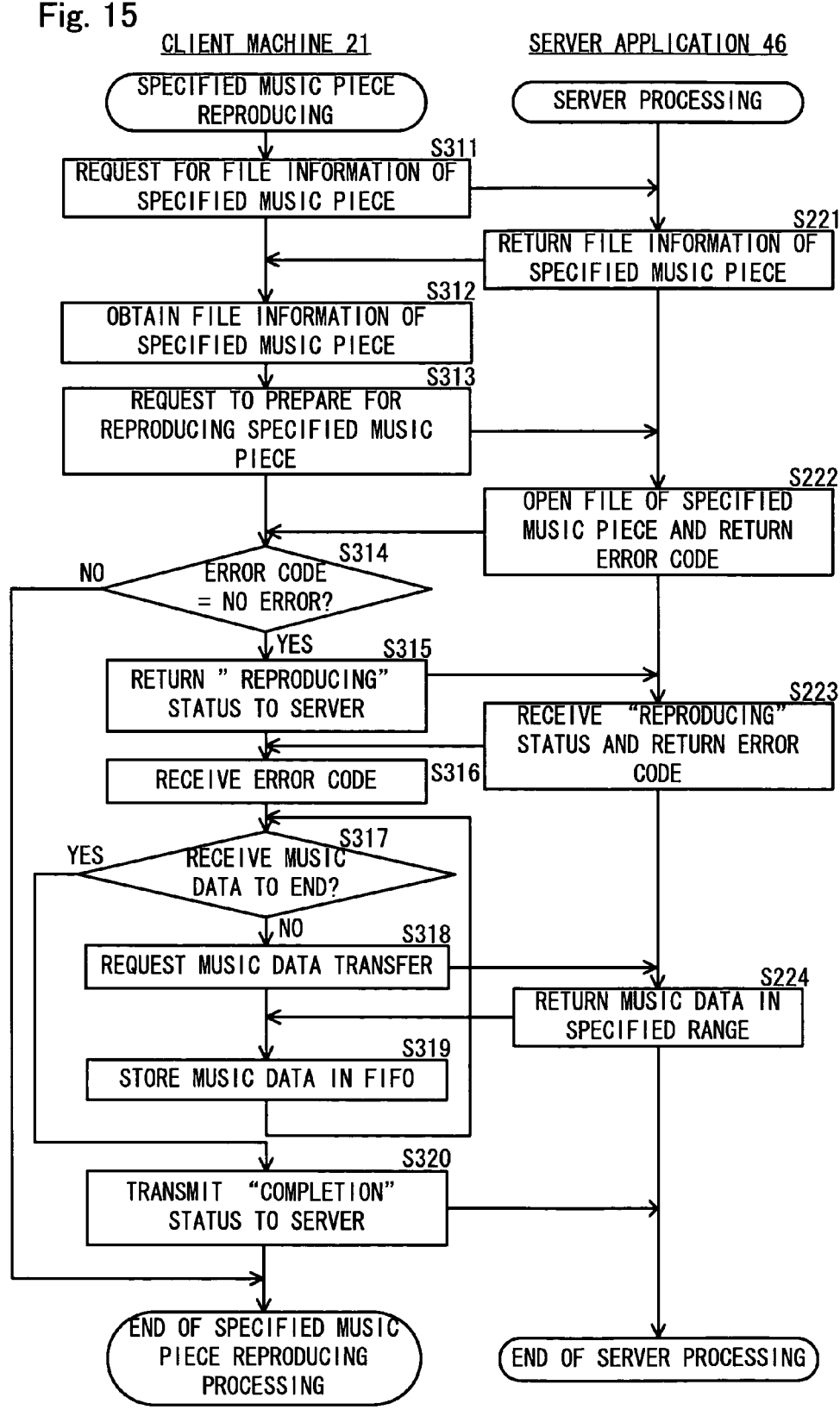
FIG. 15 is a flow chart for use in illustration of details of the specified music piece reproducing processing in FIG. 13.

Now, referring to FIG. 15, specified music piece reproducing processing will be described.

Figure 16:
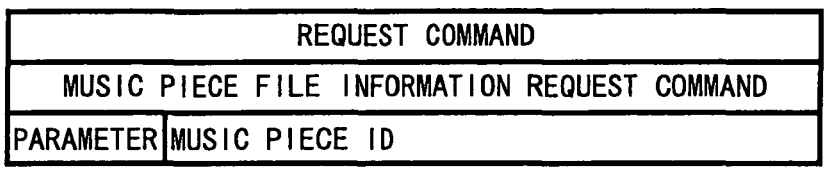
FIG. 16 is a table showing a music piece file information request command transmitted to the server application from the client machine in FIG. 15.
Figure 17:
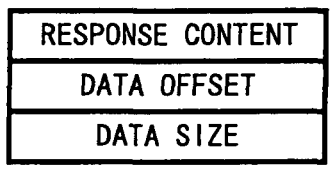
FIG. 17 is a table showing music piece file information returned from the server application to the client machine in FIG. 15.

The client machine 21 responds to a specified music piece reproducing instruction command to transmit a music piece file information request command shown in FIG. 16 and requests the server application 46 to provide prescribed information about the AV file corresponding to the music piece ID (hereinafter simply as "music piece file information") (S311). The server application 46 responds to the music piece file information request command to return music piece file information shown in FIG. 17 to the client machine 21 (S221). The music piece file information includes the data offset and the data size of the AV file 50 corresponding to the music piece ID. The server application 46 sets the starting position of the audio data as the data offset and the byte number from the starting position to the ending position as the data size. The client machine 21 receives the music piece file information (S312).

Figure 18:
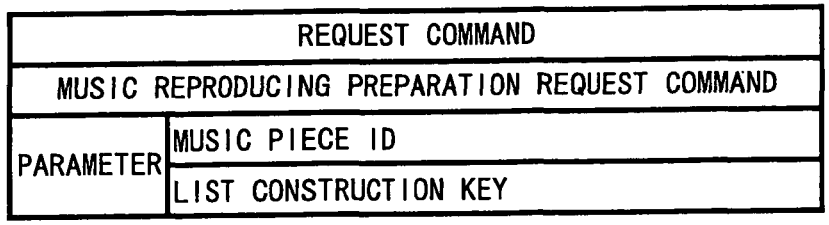
FIG. 18 is a table showing music piece reproducing preparation request command transmitted from the client machine to the server application in FIG. 15.
Figure 19:
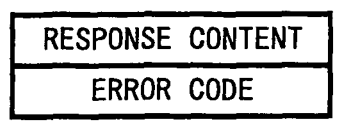
FIG. 19 is a table showing an error code returned from the server application to the client machine in FIG. 15.

The client machine 21 then transmits a music piece reproducing preparation request command shown in FIG. 18 to the server application 46 and requests the server application 46 to prepare for reproducing the specified music piece (S313). The music piece reproducing preparation request command includes the music piece ID and the list construction key. The server application 46 responds to the music piece reproducing preparation request command to open the AV file corresponding to the music piece ID and returns the error code shown in FIG. 19 to the client machine 21 (S222). The server application 46 sets "error present" as the error code if there is no AV file 50 or the AV file 50 is not successfully opened and "no error" as the error code if the file is successfully opened. If the AV file 50 is successfully opened, the server application 46 updates the "songID" and "curKey" in the client information shown in Table 2 based on the music piece ID and the list construction key included in the music piece reproducing preparation request command.

The client machine 21 receives the error code and determines whether there is an error (S314). If there is no error, the client machine 21 transmits a reproducing status to the server application 46 (S315). The server application 46 receives the reproducing status and returns the error code in which the presence/absence of an error is set to the client machine 21 (S223). The client machine 21 receives the error code (S316).

Figure 20:
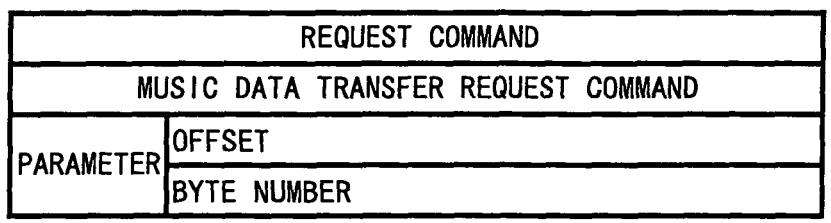
FIG. 20 is a table showing a music data transfer request command transmitted from the client machine to the serve application in FIG. 15.
Figure 21:
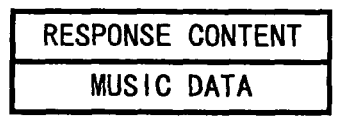
FIG. 21 is a table showing music data returned from the server application to the client machine in FIG. 15.

The client machine 21 then transmits a music data transfer request command as shown in FIG. 20 and requests the server application 46 to transfer music data in a specified range of the music data of the specified music piece (S318). The music data transfer request command includes the offset and the byte number. The client machine 21 sets the start address of the music data that should start to be transferred as the offset, and the size of the music data to be transferred by a single transfer as the byte number. The server application 46 responds to the music data transfer request command to return the music data in the specified range in FIG. 21 to the client machine 21 (S224). The client machine 21 receives the music data and stores the data in the FIFO memory 60 (S319).

The client machine 21 determines whether or not the entire music data of the specified music piece has been received based on the data size obtained in step S312 (S317). If the entire data has been received, the client machine 21 transmits a completion status to the server application 46 (S320).

When the user operates the client machine 21 and the client machine 21 finishes reproducing the specified music piece in response to the operation, or when the user operates the client machine 21 and the client machine 21 stops reproducing the music piece midway in response to the operation, the client machine 21 transmits a stop status. Meanwhile, when the user operates the controller and the client machine 21 finishes reproducing the music piece specified by the controller in response to the operation, the client machine 21 transmits a completion status.

As in the foregoing, according to the embodiment, the user may add the client machine 21 to the PC 10 owned by the user and install the server application 46 and the controller application 48 in the PC 10, so that the user can readily build up the network audio system 1 without a knowledge of LAN. In the network audio system 1, the client machine 21 can be operated by the PC 10, and AV files 50 are distributed through the LAN 18 from the PC 10 to the client machine 21, so that alert tones and the like produced by the PC 10 do not mix into music sound, and high-quality music can be reproduced.

Although the present invention has been described and illustrated in detail, it is clearly understood that the same is by way of illustration and example only and is not to be taken by way of limitation. The invention may be embodied in various modified forms without departing from the spirit and scope of the invention.

What is claimed is:

1. A network AV system, comprising:
a personal computer having a memory device for storing a plurality of AV files; and
an AV device comprising:
a client computer connected to said personal computer through a Local Area Network (LAN); and
a reproducer reproducing an AV signal based on an AV file distributed from said personal computer and outputting the reproduced AV signal,
said personal computer having a server application program and a controller application program-stored on a computer-readable medium,
said controller application program, executed by the personal computer to carry out the steps of:
selecting a desired AV file among the plurality of AV files stored in said memory device; and
transmitting a reproducing instruction command initiated at the personal computer through the network to the AV device, said reproducing instruction command instructing the AV device to reproduce the selected AV file,
said client computer having a client application program stored on another computer-readable medium, said client application program, executed by the client computer to transmit a request to distribute said selected AV file through the network to the personal computer in response to receiving the reproducing instruction command from said personal computer, said server application program, executed by the personal computer to carry out the steps of:

reading out said selected AV file from said memory device in response to the request for distribution received from said AV device; and distributing said read out AV file through the network to said AV device.

2. The network AV system according to claim 1, wherein said memory device has a server region under the control of said server application program and a general region other than the server region, said memory device stores a database for registering AV information related to said AV files, said step of selecting selects said desired AV file among the AV files stored in said general region, and said server application program further causing the step of registering AV information related to said selected AV file in said database.

3. The network AV system according to claim 2, wherein said controller application program further causing the steps of:

producing said AV information based on the tag information of said selected AV file; and requesting said server application program to register said produced AV information, and said step of registering registers said produced AV information in response to the request for registration from said controller application program.

4. The network AV system according to claim 3, wherein said server application program further causes the steps of:

comparing said produced AV information to the AV information registered in said database, and proceeding to said step of registering if said produced AV information is not registered in said database.

5. The network AV system according to claim 2, wherein said step of registering provides said AV information with an identifier, said server application program further causes the step of transmitting said identifier to said controller application program, and said step of instructing transmits said identifier to said AV device.

6. The network AV system according to claim 1, wherein said controller application program further causing the steps of:

displaying icons for a plurality of said AV device on a display for said personal computer, and displaying information regarding a selected AV device among said plurality of AV devices on the display for said personal computer.

7. The network AV system according to claim 1, wherein said controller application program further comprises the step of displaying an icon for said AV device on a display for said personal computer, and said step of selecting selects said desired AV file in response to the operation of a user to drag and drop an icon for said desired AV file to the icon for said AV device.

8. The network AV system according to claim 1, wherein said controller application program further causes the step of displaying a list of said AV file among a plurality of desired files in response to the operation of a user to drag and drop icons for said plurality of desired files to the icon for said AV device on a display for said personal computer.

9. The network AV system according to claim 1, wherein said memory devise further stores a first list construction key necessary for producing a list of AV files which said AV device reproduces said AV signal based on, said controller application program further comprises the steps of:

setting a second list construction key necessary for specifying a temporary list of AV files which said AV device reproduces said AV signal based on, said second list construction key including information for identifying said controller application program that has instructed said AV device, and comparing said first list construction key with said second list construction key to determine whether or not said controller application program has instructed said AV device when said AV device completes reproduction of said selected AV file, and said step of instructing instructs said AV device to reproduce the next AV file among said temporary list when said controller application program has instructed said AV device as a result of the determination.

10. A server application program and controller application program stored on at least one non-transitory computer-readable medium, executed by a personal computer that is connected through a Local Area Network (LAN) to a client computer included in an AV device, said client computer having a memory device for storing a plurality of AV files, the controller application program executed by the personal computer to carry out the steps of:

selecting a desired AV file among the plurality of AV files stored in said memory device; and transmitting a reproducing instruction command initiated at the personal computer through the network to the AV device, said reproducing instruction command instructing the AV device to reproduce the selected AV file;

the server application program executed by the personal computer to carry out the steps of:

reading out said selected AV file from said memory device in response to a request for distribution received from said AV device; and distributing said read out file through the network to said AV device.

11. The controller application program product according to claim 10, wherein said memory device has a server region under the control of said server application program and a general region other than the server region, and said step of selecting selects the desired AV file among the AV files stored in said general region.

12. The controller application program product according to claim 11, further causing the personal computer to perform the steps of:

producing AV information based on the tag information of the selected AV file; and requesting said server application program to register the produced AV information.

13. The controller application program according to claim 10, further causing the personal computer to perform the step of displaying an icon for said AV device on a display for said personal computer, wherein said step of selecting selects the desired AV file in response to the operation of a user to drag and drop an icon for the desired AV file to the icon for said AV device.

14. The controller application program product according to claim 10, further causing the personal computer to perform the steps of:
- displaying icons for a plurality of said AV device on a display for said personal computer, and
- displaying information regarding a selected AV device among said plurality of AV devices on the display for said personal computer.

15. The controller application program according to claim 10, further causing the personal computer to perform the step of displaying a list of said AV file among a plurality of desired files in response to the operation of a user to drag and drop icons for said plurality of desired files to the icon for said AV device on a display for said personal computer.

16. A controller application program and server application program stored on at least one
- non-transitory computer-readable medium, executed by a personal computer that is connected through a Local Area Network (LAN) to a client computer included in an AV device, said client computer having a memory device for storing a plurality of AV files;
- the controller application program executed by the personal computer to carry out the steps of:
- selecting an AV file among the plurality of AV files stored in said memory device and transmitting a reproducing instruction command initiated at the personal computer through the network to the AV device, said reproducing instruction command instructing the AV device to reproduce the selected AV file;
- the server application program executed by the personal computer to carry out the steps of:
- reading out the selected AV file from said memory device in response to a request received from said client computer;
- distributing the read out AV file through the network to said AV device; and
- registering AV information related to the selected AV file in a database stored in said memory device.

17. The server application program according to claim 16, wherein
- said step of registering registers the AV information produced by said controller application program based on the tag information of the selected AV file.

18. The server application program according to claim 16, further causing the personal computer to perform the steps of:
- comparing said produced AV information to the AV information registered in said database, and
- proceeding to said step of registering if the produced AV information is not registered in said database.

19. The server application program product according to claim 16, wherein
- said step of registering provides the AV information with an identifier,
- said server application program product further causes the personal computer to perform the step of transmitting the identifier to said controller application program.

* * * * *